Patented Mar. 31, 1936

2,035,698

UNITED STATES PATENT OFFICE 2,035,698

TACKY RUBBER COMPOSITIONS AND METHODS OF MAKING THE SAME

Harry L. Fisher, Leonia, N. J., assignor, by mesne assignments, to United States Rubber Company, New York, N. Y., a corporation of New Jersey No Drawing. Application March 7, 1932, Serial No. 597,420

27 Claims. (Cl. 260—1)

This invention relates to highly tacky rubber compositions and methods of making the same.

In operations in the manufacture of rubber where a rubber material having a definite tack is desired, it is frequently the practice to produce such tack by adding softening agents to the rubber composition, by breaking down the rubber on the mill to a greater extent than usual, and sometimes by heating the rubber material. By the present invention, I obtain an elastic rubber material with an exceptionally strong tack and a material which will retain its strong tack even after long heating in oxygen under pressure at temperatures of from 60° to 70° C., or after long contact with air at normal or elevated temperatures.

In carrying out my invention, I mix with rubber a nitroso compound and after mixing allow the material to stand for several days at room temperature or heat the same for a short time preferably under a slightly elevated pressure. When the nitroso compound is mixed with the rubber on a mill, the mix sometimes shows an effect similar to the "scorching" or stiffening which may occur in vulcanizable rubber compositions containing "ultra" accelerators. However, on standing for several days at room temperature in contact with air or oxygen, or on heating for a short period of time in contact with air or oxygen, which may or may not be mixed with steam, the composition is converted into a soft mass having a very strong tack, the product thus formed constituting a new material.

The new composition as prepared according to the present invention differs from ordinary heated rubber, such as heated pale crepe, in that a permanent tack is acquired, as shown in oxygen bomb tests. If rubber is excessively milled or heated in order to form a somewhat tacky material and subjected to oxygen bomb tests, the rubber at first becomes exceedingly soft and then hardens to a brittle resinous material having no tack. As described in more detail in the examples, the reaction products of rubber and nitroso compounds even after treatment up to several hundred hours in the oxygen bomb at the usual testing temperatures, show no hardened surface or resin formation, and the material remains soft and tacky. It has been known previously to add small amounts of certain nitroso compounds to rubber in the presence of sulphur, the same acting as accelerators of vulcanization, and it has also been known to add nitroso compounds such as para-nitroso-dimethylaniline with certain accelerating agents to check vulcanization. Further, nitrosamines have been used as anti-oxidants along with accelerating agents, and also as anti-scorch materials in vulcanizable rubber compositions containing "ultra" and "semi-ultra" accelerators. In all these cases, the nitroso compounds have been added in small amounts in the presence of vulcanizing ingredients and have been used in one way or another to modify the vulcanization characteristics of the rubber compound. According to the present invention, nitroso compounds are added to a rubber composition devoid of vulcanization characteristics, such as raw rubber, or a rubber compound free from vulcanizing ingredients or with insufficient vulcanizing ingredients to be of itself capable of vulcanization, and a reaction is accomplished directly between the rubber material and the nitroso compound.

Nitroso compounds, such as nitroso-benzene, nitroso-beta-naphthol, p-nitroso-diphenylamine, diphenyl-nitrosamine, p-nitroso-dimethylaniline, p-nitroso-diethylaniline, nitroso-R-salt, p-nitroso-phenol, p-nitroso-thymol and p-nitroso-o-cresol, may be mixed with rubber on the mill or, if desired may be dissolved in a solvent and added to a rubber cement. In either case, it is desirable to heat the mixture in order to complete the formation of the highly tacky rubber composition which it is desired here to produce. It appears that about 2 to 5 parts of the nitroso compound to 100 parts of rubber produce the optimum result, both from the characteristics of the product obtained and from commercial considerations. However, I do not desire to be limited to such proportions since experiments have shown that lesser proportions, even as small amounts as 1 part of a nitroso compound per 100 parts rubber will, to a certain extent, give a desirable tacky product, while greater proportions than 5 parts of nitroso compound per 100 parts rubber will also produce an excellent, although possibly needlessly expensive, product.

As specific illustrations of various manners of carrying out the invention, but without intention to limit the invention except as required by the prior art, the following examples are included:

*Example I.*—2 to 5 parts of nitroso-benzene were mixed with 100 parts of pale crepe on a mill. The various mixes were heated in air for from 15 minutes to 2 hours at about 141° C. The material was thereby converted into a composition having a very strong tack, and retaining a fairly light color. The mix with 5 parts of nitroso-benzene and 100 parts pale crepe underwent a change on the mill very similar to scorching, that is, it became stiffer, but after removal and heating in air, a highly tacky, elastic product was obtained. A sample was placed in a tin dish and heated at 60° C. in oxygen under a pressure of 300 lbs. per sq. in. The material softened and flowed a little but maintained its strong tack and its elasticity even after 500 hours treatment in the oxygen bomb.

*Example II.*—2 to 5 parts of nitroso-beta-naphthol were mixed into 100 parts of pale crepe. The mix was removed from the mill and heated 1 to 2 hours in air at about 141° C. The material was converted into an elastic composition having a very strong tack. The composition had acquired a much darker color than similar compositions treated with nitroso-benzene as described in Example I.

*Example III.*—3 parts of nitroso-beta-naphthol were milled into 100 parts of rubber and samples of the mixture were heated 1 to 2 hours in air at about 141° C. The material was converted into a soft elastic composition having a very strong tack. These samples were then heated in an oxygen bomb at 60° C. and even after 336 hours of such heating they were soft and tacky, and showed no hardened surface or resin formation such as would be obtained by a similar treatment of a heated pale crepe rubber without the addition of a nitroso compound.

*Example IV.*—As illustrations of the preparation of the products in solution, 5% pale crepe solutions in solvent naphtha, to which sufficient nitroso-beta-naphthol had been added to make 3 and 5 parts per 100 parts rubber, were heated under a reflux on a steam bath for 6 hours and for 26½ hours. The solutions were then placed in shallow receptacles and the solvent was allowed to evaporate. All the products so obtained were soft and tacky, those heated for the longer periods of time being softer and tackier than those heated for the shorter periods.

Aqueous dispersions of rubber, such as natural or artificial latex, may be subjected to the action of nitroso compounds, preferably in amount up to 5 parts nitroso compound per hundred parts of rubber. The nitroso compound may be added directly to the rubber dispersion or added in the form of a solution and emulsified with the rubber dispersion, or the nitroso compound may itself be dispersed in water with the aid of suitable dispersing agents and the resulting dispersion added to the rubber dispersion. The aqueous dispersion of rubber containing the nitroso compound may be heated to produce an aqueous dispersion of the material of the invention which may be employed as such, or which may be dried or coagulated to recover the solids therein as a highly tacky material. The rubber dispersion may be stabilized against the possibility of coagulation by the nitroso compound by the addition to the rubber dispersion of a small amount of stabilizer such as salicin, arbutin, or saponin in a manner well known in the art.

The materials of the present invention may be used in places where strong permanent tack is required, for example in operations where articles are made up from separate parts, as in tire manufacture and the manufacture of many mechanical articles. The compositions of the present invention are soluble in benzene and similar organic solvents and may very effectively be used in rubber cements and the like where an unusually strong tack is desirable, as in cements used in footwear manufacture. The products of the invention may also be dispersed in water by the use of suitable dispersing agents similarly to the preparation of artificial dispersions of rubber, and the resulting dispersions may be employed as adhesive compositions in place of solvent cements. Solvent solutions and aqueous dispersions of the highly tacky materials may also be prepared directly from solutions and dispersions of rubber as above described, as well as by dissolving the tacky materials themselves in a solvent or dispersing the same in water. The compositions of the present invention are also especially adapted for use in friction coatings for adhesive tape. Other similar uses for the same will readily occur to persons skilled in the art.

While specific embodiments of the invention have been described, it is obvious that numerous modifications may be made therein and it is not desired to limit the invention otherwise than as set forth in the appended claims.

Having thus described my invention, what I claim and desire to protect by Letters Patent is:

1. A method of producing a highly tacky rubber composition comprising treating a rubber composition devoid of vulcanization characteristics with two to five parts of aromatic nitroso compound per hundred parts of rubber.

2. A method of producing a highly tacky rubber composition comprising treating a rubber composition devoid of vulcanization characteristics with two to five parts of organic nitroso compound from the group consisting of nitroso-benzene, nitroso-beta-naphthol, p-nitroso-diphenylamine, diphenyl-nitrosamine, p-nitroso-dimethylaniline, p-nitroso-diethylaniline, nitroso-R-salt, p-nitroso-phenol, p-nitroso-thymol and p-nitroso-o-cresol per hundred parts of rubber.

3. A method of producing a highly tacky rubber composition comprising treating a rubber composition devoid of vulcanization characteristics with two to five parts of nitroso-beta-naphthol per hundred parts of rubber.

4. A method of modifying the physical properties of solid crude rubber which comprises mixing therewith up to five parts of aromatic nitroso compound per hundred parts of rubber, in the absence of the usual vulcanizing ingredients.

5. A method of modifying the physical properties of solid crude rubber which comprises mixing therewith up to five parts of nitroso-beta-naphthol per hundred parts of rubber, in the absence of the usual vulcanizing ingredients.

6. A method of producing a highly tacky rubber composition comprising treating raw rubber with two to five parts of aromatic nitroso compound per hundred parts of rubber.

7. A method of producing a highly tacky rubber composition comprising treating raw rubber with two to five parts of organic nitroso-compound from the group consisting of nitroso-benzene, nitroso-beta-naphthol, p-nitroso-diphenylamine, diphenyl-nitrosamine, p-nitroso-dimethylaniline, p-nitroso-diethylaniline, nitroso-R-salt, p-nitroso-phenol, p-nitroso-thymol and p-nitroso-o-cresol, per hundred parts of rubber.

8. A method of producing a highly tacky rubber composition comprising treating raw rubber with two to five parts of nitroso-beta-naphthol per hundred parts of rubber.

9. A method of producing a highly tacky rubber composition comprising mixing a rubber composition devoid of vulcanization characteristics with an aromatic nitroso compound, and exposing the resulting product to an oxygen containing gas.

10. The method of producing a highly tacky rubber composition comprising mixing 100 parts of rubber composition devoid of vulcanization characteristics with up to 5 parts of organic nitroso compound, and exposing the resultant product to an oxygen containing gas.

11. A method of producing a highly tacky rubber composition comprising mixing a rubber composition devoid of vulcanization characteristics with an aromatic nitroso compound, and heating the resultant product in the presence of an oxygen containing gas.

12. A method of producing a highly tacky rubber composition comprising mixing raw rubber with organic nitroso compound from the group consisting of nitroso-benzene, nitroso-beta-naphthol, p-nitroso-diphenylamine, diphenyl nitrosamine, p-nitroso-dimethylaniline, p-nitroso - dietthylaniline, nitroso - R - salt, p-nitroso-phenol, p-nitroso-thymol and p-nitroso-o-cresol, and exposing the resulting product to an oxygen containing gas.

13. A method of producing a highly tacky rubber composition comprising mixing 100 parts of raw rubber with up to 5 parts of organic nitroso compound, and exposing the resulting product to an oxygen containing gas.

14. A method of producting a solution or dispersion of a highly tacky rubber composition comprising treating a solution or dispersion of rubber with up to 5 parts aromatic nitroso compound per 100 parts rubber.

15. A method of producing a solution or dispersion of a highly tacky rubber composition comprising treating a solution or dispersion of a rubber composition devoid of vulcanization characteristics with organic nitroso compound from the group consisting of nitroso-benzene, nitroso-beta-naphthol, p-nitroso-diphenylamine, diphenyl - nitrosamine, p - nitroso - dimethylaniline, p-nitroso-diethylaniline, nitroso-R-salt, p-nitroso-phenol, p-nitroso-thymol and p-nitroso-o-cresol, in proportions of 100 parts rubber and up to 5 parts nitroso compound.

16. A highly tacky rubber composition comprising the reaction product of 100 parts rubber and 2 to 5 parts aromatic nitroso compound.

17. A highly tacky rubber composition comprising the reaction product of 100 parts rubber and 2 to 5 parts organic nitroso compound from the group consisting of nitroso-benzene, nitroso-beta-naphthol, p-nitroso-diphenylamine, diphenyl-nitrosamine, p-nitroso-dimethylaniline, p-nitroso-diethylaniline, nitroso-R-salt, p-nitroso-phenol, p-nitroso-thymol and p-nitroso-o-cresol.

18. A highly tacky rubber composition comprising the reaction product of 100 parts rubber and 2 to 5 parts nitroso-beta-naphthol.

19. A highly tacky rubber composition comprising the reaction product of 100 parts of a rubber composition devoid of vulcanization characteristics, and 2 to 5 parts of aromatic nitroso compound.

20. A highly tacky rubber composition comprising the reaction product of 100 parts of a rubber composition devoid of vulcanization characteristics, and 2 to 5 parts of organic nitroso compound from the group consisting of nitrosobenzene, nitroso-beta-naphthol, p-nitroso-diphenylamine, diphenyl-nitrosamine, p-nitroso-dimethylaniline, p-nitroso-diethylaniline, nitroso-R-salt, p-nitroso-phenol, p-nitroso-thymol and p-nitroso-o-cresol.

21. A highly tacky rubber composition comprising the reaction product of 100 parts of a rubber composition devoid of vulcanization characteristics, and 2 to 5 parts of nitroso-beta-naphthol.

22. A highly tacky rubber composition comprising the reaction product of 100 parts raw rubber and 2 to 5 parts of aromatic nitroso compound.

23. A highly tacky rubber composition comprising the reaction product of 100 parts raw rubber and 2 to 5 parts of organic nitroso compound from the group consisting of nitroso-benzene, nitroso-beta-naphthol, p-nitroso-diphenylamine, diphenyl-nitrosamine, p-nitroso-dimethylaniline, p - nitro - diethylaniline, nitroso - R - salt, p-nitroso-phenol, p-nitroso-thymol and p-nitroso-o-cresol.

24. A highly tacky rubber composition comprising the reaction product of 100 parts raw rubber and 2 to 5 parts of nitroso-beta-naphthol.

25. A crude rubber free from vulcanizing ingredients and having incorporated therein up to 5 parts organic nitroso compound per 100 parts rubber.

26. A crude rubber free from vulcanizing ingredients and having incorporated therein up to 5 parts organic nitroso compound from the group consisting of nitroso-benzene, nitroso-beta-naphthol, p-nitroso-diphenylamine, diphenyl-nitrosamine, p - nitroso - dimethylaniline, p - nitroso-diethylaniline, nitroso-R-salt, p-nitroso-phenol, p-nitroso-thymol and p-nitroso-o-cresol per 100 parts rubber.

27. A crude rubber free from vulcanizing ingredients and having incorporated therein up to 5 parts nitroso-beta-naphthol per 100 parts rubber.

HARRY L. FISHER.